Jan. 17, 1933.    C. NELSON    1,894,280
PRESSURE COOKER
Filed Jan. 9, 1931    2 Sheets-Sheet 1

INVENTOR
CARL NELSON
By Paul Paul & Moore
ATTORNEYS

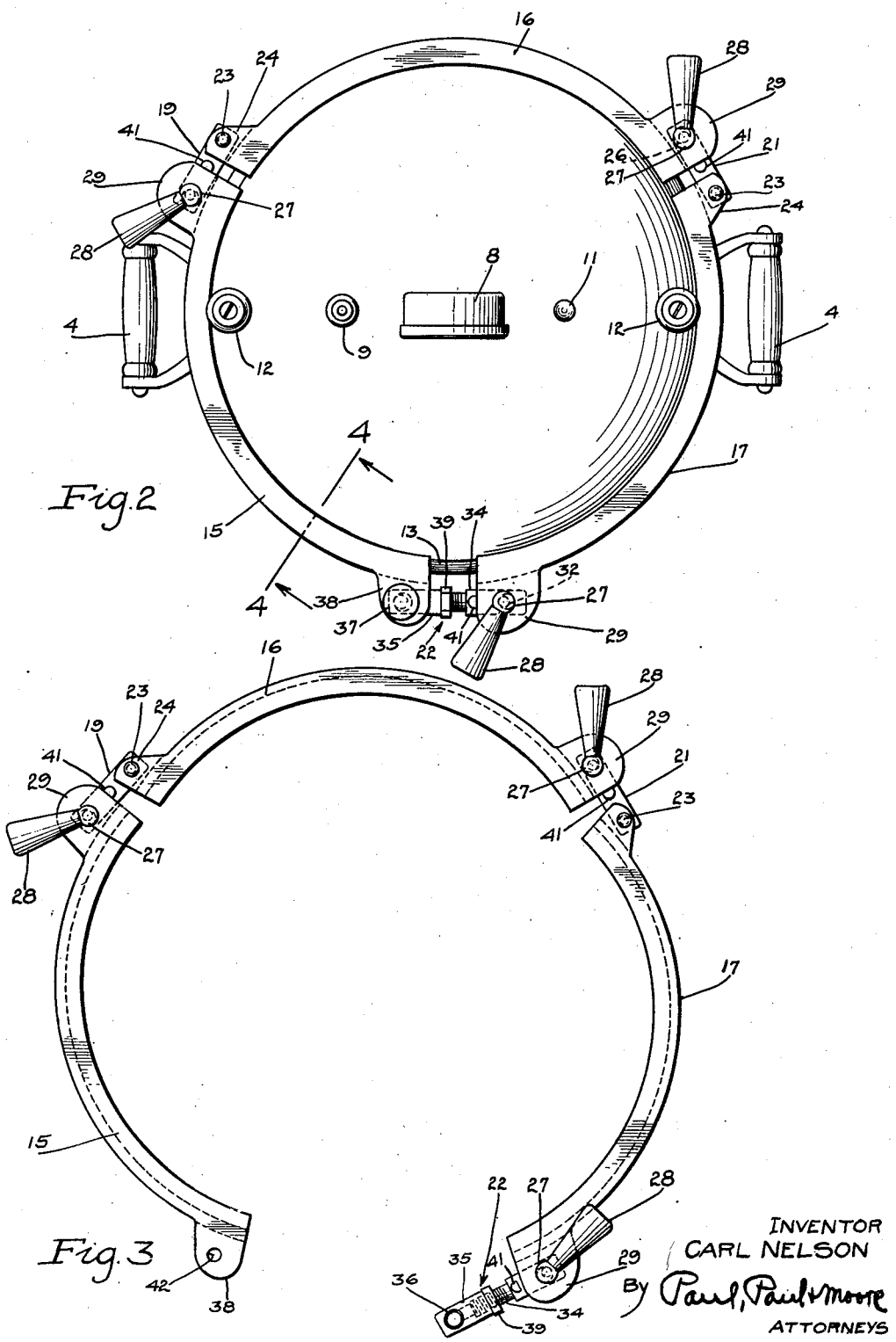

Patented Jan. 17, 1933

1,894,280

UNITED STATES PATENT OFFICE

CARL NELSON, OF EAU CLAIRE, WISCONSIN, ASSIGNOR TO NATIONAL PRESSURE COOKER COMPANY, OF EAU CLAIRE, WISCONSIN, A CORPORATION OF WISCONSIN

PRESSURE COOKER

Application filed January 9, 1931. Serial No. 507,641.

This invention relates to new and useful improvements in pressure cookers, and an object of the invention is to provide in a device of this character, a novel means for securing the cover to the cooker body in leak-proof relation.

A further object is to provide a pressure cooker comprising a body having a cover therefor provided with means for securing it to the body in leak-proof relation, said means being provided with means whereby the cover cannot accidentally be blown off the cooker, in the event that the means for securing the cover is released while the cooker is under pressure from steam confined therein.

A further object is to provide in combination with a pressure cooker and a cover therefor, a clamping ring including a plurality of pivotally connected segmental sections, each including portions adapted to engage the cooker body and cover, and said clamping ring being provided with eccentric means for contracting it to secure the cover to the cooker body.

A further object is to provide in combination with a pressure cooker having an annular flange at its upper portion, and a cover for said body having an annular portion adapted to be situated above the annular flange of the body, a clamping ring including a plurality of segmental sections, of channel cross-section, adapted to engage the annular flange of the cooker body and the annular portion of the cover, and each of said segmental sections having a link pivotally connected with one end thereof and having an eccentric mounted in the opposite end thereof, said eccentrics being adapted to be engaged with said links whereby, when the clamping ring is operatively engaged with the cooker body and the cover and said eccentrics are actuated, the clamping ring will be contracted to secure the cover to the cooker body in leak-proof relation.

A further object is to provide a clamping ring for securing a cover to a pressure cooker body, comprising a clamping ring including a plurality of pivotally connected segmental sections, each provided with an eccentric, whereby the clamping ring may be expanded or contracted, and means being provided for varying the diameter of the clamping ring, whereby it may be accurately fitted to those portions of the cooker body and cover with which it is adapted to be engaged, so that the cover may be tightly secured to the cooker body.

Other objects of the invention will appear from the following description and accompanying drawings, and will be pointed out in the annexed claims.

In the accompanying drawings, there has been disclosed a structure designed to carry out the various objects of the invention, but it is to be understood that the invention is not confined to the exact features shown as various changes may be made within the scope of the claims which follow.

In the drawings:

Figure 2 is a plan view of Figure 1;

Figure 3 is a view showing the clamping ring detached from the cooker;

Figure 1:
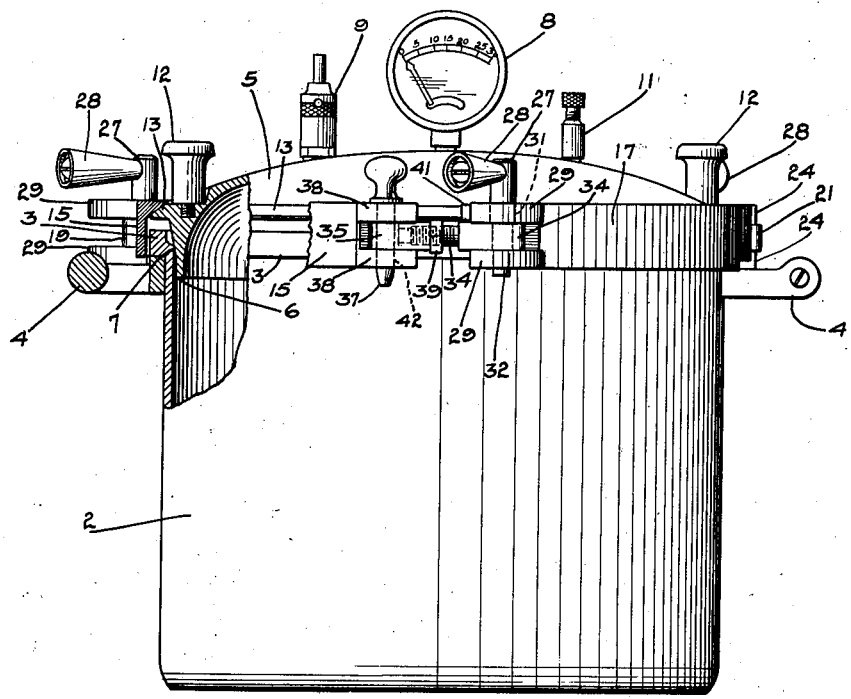
Figure 1 is a side elevation illustrating a pressure cooker with the invention embodied in the construction thereof.

In the selected embodiment of the invention here shown, for purposes of disclosure, there is illustrated in Figure 1, a pressure cooker comprising a body portion 2 having an annular flange 3 provided at its upper portion. Handles 4 are suitably secured to the cooker body 2, preferably directly beneath the flange 3, as shown in Figure 1.

Figure 4:
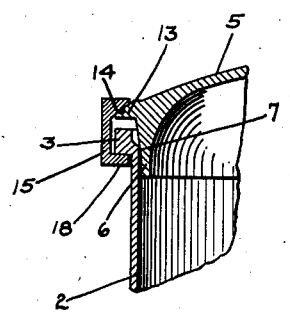
Figure 4 is a detail sectional view on the line 4—4 of Figure 2, showing the relative positions of the cover and clamping ring upon the upper portion of the cooker body.

The cooker body 2 is provided with a cover 5 having a depending annular flange 6, the periphery of which is tapered, as shown in Figures 1 and 4. This flange is adapted to be inserted into the upper open end of the cooker body to engage a seat 7 to provide a leak-proof joint between the cooker body and the cover. The cover is shown provided with the usual steam gauge 8, safety valve 9, and pet cock 11, the purposes of which are well-known. The cover is further provided with lifting handles or grips 12, whereby it may be conveniently moved about from place to place.

An important feature of this invention resides in the means provided for securing the cover 5 to the cooker body. As shown in Figures 1 and 4, the cover is provided with an outwardly extending annular flange 13, the upper portion of which is beveled as shown and adapted to be engaged by correspondingly shaped faces 14 provided upon a plurality of segmental segments 15, 16, and 17, which are of channel cross section, as best shown in Figure 4. The lower inwardly extending portions 18 of the segments are adapted to engage the bottom face of the annular flange 3 of the cooker body.

Figure 6:
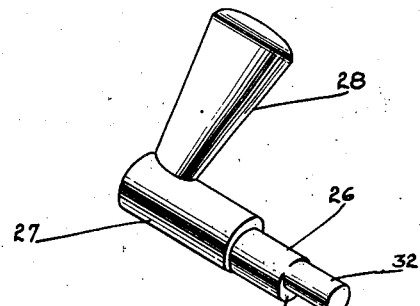
Figure 6 is a perspective view of one of the eccentrics removed from the clamping ring.

Preferably three segmental sections are used, and these are pivotally connected together at their ends to form a clamping ring adapted to surround the flanges 3 and 13 of the cooker body and cover, respectively, as shown. The means for pivotally connecting together the segmental sections is best shown in Figures 2 and 3, and consists of links 19, 21, and 22. The links 19 and 21 are each connected at one end with their respective sections 16 and 17 by suitable pins 23 supported in spaced ears 24 provided upon these two segments, and between which the links 19 and 21 are positioned. The opposite end portions of the links 19 and 21 are provided with suitable apertures 25, each adapted to receive an eccentric 26 provided upon a stud 27 having a suitable finger grip 28, as best shown in Figure 6.

The studs 27 are supported in spaced ears 29 provided at one end of each segmental section, and between which the apertured end portions of the links 19, 21, and 22 are adapted to be positioned, as shown in Figures 2 and 3, so that the eccentrics 26 of the studs 27 may be engaged with the apertures 25 provided therein. The upper ear 29 of each segmental section is provided with an aperture 31 adapted to receive the enlarged body portion 27 of the eccentric stud, and the lower ears 29 of the sections are apertured to receive the reduced end portions 32 of the eccentric stud 27, thereby to provide suitable bearings for said eccentrics. The shoulders 33 provided adjacent to the reduced end portions 32 of the eccentric studs 27 engage the upper surfaces of the lower ears 29 to prevent downward movement of the eccentrics 26. If desired, the lower terminals of the eccentric studs 27 may be slightly riveted over or provided with other means for preventing the studs 27 from accidentally becoming detached from the ears 29.

Means are provided for varying the diameter of the clamping ring whereby it may be accurately fitted to the flanges 3 and 13 of the cooker body and cover, respectively. Such means is shown in Figures 2 and 3, and preferably consists in making the link 22 of two parts adjustably secured together, whereby said link may be varied in length. The link 22 comprises a part 34 which is threaded to receive a part 35, having an aperture 36 therein adapted to receive a pin or bolt 37 whereby the part 35 may be detachably connected with the spaced ears 38 of the segmental section 15. A suitable lock nut 39 provides means for locking the parts 34 and 35 together in fixed relation.

Figure 5:
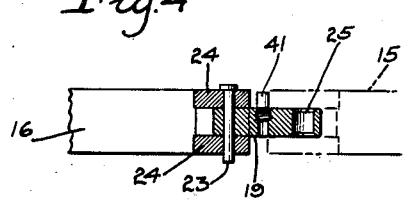
Figure 5 is a detail sectional view showing the means for limiting rotary movements of the eccentrics.
Figure 7:
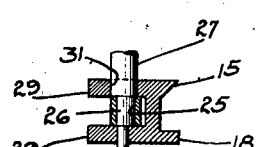
Figure 7 is a detail sectional view showing one of the eccentrics seated in the clamping ring.

Means are provided for limiting rotation of the eccentrics 26 so that when the clamping ring is engaged with the flanges of the cooker body and the cover, and the eccentrics are manipulated to secure the cover to the body, they cannot be rotated past center. Such a means is shown in Figures 2, 3, and 5, and may consist in the provision of suitable stop pins 41 in the links connecting together the segmental sections 15, 16, and 17. These stop pins are adapted to be engaged by the edges of the ears 29, as shown in Figure 2, when the eccentrics are rotated in a direction to secure the closure to the cooker body. By relatively adjusting the parts 34 and 35 of the connecting link 22, the diameter of the clamping ring may be so adjusted that when the eccentrics are rotated to substantially move the stop pins 41 into engagement with the ears 29, the cover will be securely engaged with its seat 7 in a manner to provide a steam-tight joint between the cooker body and closure.

To secure the cover to the cooker body, the cover is placed upon the cooker with its depending flange 6 engaged with the seat 7, as shown in Figure 1, it being understood that while the cover is being removed from or placed upon the cooker body, the clamping ring is detached from the cooker, as shown in Figure 3. When the cover is seated upon the cooker body, the operator will place the clamping ring in engagement with the flanges 3 and 13 of the cooker body and cover, respectively, and will move the link 22 into position between the ears 38 of the section 15 so that the pin or bolt 37 may be inserted through the apertures 42 provided in the ears 38 and through the aperture 36 in the part 35 of the link 22. The eccentric studs 27 are then rotated, causing the clamping ring to contract, whereby the engaging bevel faces 13 and 14 of the cover and clamping ring, respectively, will cause the cover to be forced downwardly into engagement with its seat, because of the lower flange 18 of the cover being engaged with the flange 3 of the cooker body. The cover will be retained in such position until the eccentrics are rotated in the opposite direction to permit the clamping ring to expand and permit the release of the cover from its seat.

Should one or more of the eccentrics accidentally be manipulated to release the cover, while the cooker is operating under steam pressure, the cover cannot accidentally be blown off or become disengaged from the cover by the action of the expanding steam, because the eccentrics will not allow the clamping ring to expand enough to permit the flange 13 of the cover to pass through the clamping ring. This is a very important feature as it provides a positive safeguard against accidents which may be caused by the cover blowing off when its securing means are released. After the eccentrics have been manipulated to release the clamping ring, the bolt 37 may be withdrawn from the ears 38 of the section 15, whereupon the clamping ring may be expanded as shown in Figure 3 to permit its removal from the cooker and cover.

I claim as my invention:

1. A pressure cooker comprising a body having a seat therein, a cover for said body having a portion adapted to engage said seat, outwardly projecting means on said body and said cover, a clamping ring adapted to engage the projecting means on said body and said cover to secure the latter to the body, means for contracting said ring to force the cover into leak-proof engagement with said seat, and means for preventing said ring from expanding sufficiently to permit the cover to become detached from the cooker to thereby prevent the cover from being blown off the cooker, should said contracting means accidentally be actuated to release the cover while the cooker is under pressure.

2. A pressure cooker comprising a body having a seat therein, a cover for said body having a portion adapted to engage said seat, outwardly projecting means on said body and said cover, a split clamping ring adapted to engage the projecting means on said body and said cover to secure the latter to the body, eccentric means for contracting said ring to force the cover into leak-proof engagement with said seat, and means for preventing the connected ends of said ring from accidentally becoming disconnected from each other to thereby prevent the cover from being blown off the cooker, should said eccentric means accidentally be actuated to release the cover while the cooker is under pressure.

3. A pressure cooker comprising a body having an annular flange at its upper portion, a cover for said body provided with an annular portion situated above the annular flange of the body, a clamping ring comprising a plurality of segmental sections each having portions adapted to engage the annular flange of the cooker body and the annular portion of said cover, links pivotally connecting together said sections, one of said links being adjustable longitudinally to vary the diameter of said clamping ring, an eccentric in one of said segments adapted to contract the clamping ring whereby the cover may be secured to the cooker body in leak-proof relation, and means for preventing said links from becoming detached from said segments to thereby prevent the cover from being blown off the cooker, should the eccentric accidentally be actuated to release the cover while the cooker is under pressure.

4. A pressure cooker comprising a body having an annular flange at its upper portion, a cover for said body provided with an annular portion situated above the annular flange of the body, a clamping ring comprising a plurality of segmental sections each having portions adapted to engage the annular flange of the cooker body and the annular portion of said cover, links pivotally connecting together said sections, means on one of said links for varying the diameter of said clamping ring, an eccentric mounted in each segment for actuating the clamping ring and whereby the cover may be secured to the cooker body in leak-proof relation, and means for limiting the expansion of said clamping ring so that the cover cannot be blown off the cooker should one of the eccentrics accidentally be actuated to release the cover while the cooker is under pressure, said means comprising a detachable element by the removal of which the adjacent ends of two of said segments may be disconnected from each other to open the ring and permit the complete removal of the cover from the cooker.

5. A pressure cooker comprising a body having an annular flange at its upper portion, a cover for said body provided with a depending tapered flange adapted to be engaged with a seat provided in said body, said cover having an outwardly extending portion adapted to be situated above the annular flange of the body when the cover is engaged with said seat, a clamping ring comprising a plurality of segmental channel sections adapted to engage the annular flange of the cooker body and the outwardly extending portion of said cover, each segmental section having a link pivotally connected with one end thereof, an eccentric rotatably mounted in the opposite end of each section, and said links having apertures therein adapted to receive said eccentrics whereby, when the clamping ring is engaged with the flanges of the cooker body and the cover, and the eccentrics are rotated, the clamping ring will be contracted to force the cover into leak-proof engagement with its seat, and means for limiting the expansion of said clamping ring so that the cover cannot be blown off the cooker should one of the eccentrics accidentally be actuated to release the cover while the cooker is under pressure, said means comprising a bolt by the removal of which one of said links may be disconnected from one of said segmental ring sections to open the clamping ring and thereby permit the cover to be readily removed from the cooker.

6. A pressure cooker comprising a body having an annular flange at its upper portion, a cover for said body provided with a depending tapered flange adapted to be engaged with a seat provided in said body, said cover having an outwardly extending portion adapted to be situated above the annular flange of the body when the cover is engaged with said seat, a clamping ring comprising a plurality of segmental channel sections adapted to engage the annular flange of the cooker body and the outwardly extending portion of said cover, each segmental section having a link pivotally connected with one end thereof, an eccentric rotatably mounted in the opposite end of each section, said links having apertures therein adapted to receive said eccentrics whereby, when the clamping ring is engaged with the flanges of the cooker body and the cover, and the eccentrics are rotated, the clamping ring will be contracted to force the cover into leak-proof engagement with its seat, means for circumferentially adjusting said clamping ring independently of said eccentrics whereby the cover may be accurately fitted to the cooker body, and means for limiting the expansion of said clamping ring so as to prevent the cover from being blown off the cooker, should one of said eccentrics accidentally be actuated to release the cover while the cooker is under pressure, said means comprising a bolt by the removal of which the clamping ring may be released to permit the complete removal of the cover from the cooker.

In witness whereof, I have hereunto set my hand this 5th day of January, 1931.

CARL NELSON.